United States Patent [19]
Golin et al.

[11] Patent Number: 5,544,239
[45] Date of Patent: Aug. 6, 1996

[54] METHOD AND APPARATUS FOR IMPROVING MOTION ANALYSIS OF FADES

[75] Inventors: Stuart J. Golin, East Windsor; Adnan M. Alattar, Plainsboro, both of N.J.

[73] Assignee: Intel Corporation, Santa Clara, Calif.

[21] Appl. No.: 257,950

[22] Filed: Jun. 10, 1994

Related U.S. Application Data

[63] Continuation of Ser. No. 996,711, Dec. 14, 1992, abandoned.

[51] Int. Cl.$^6$ .................................................. H04N 11/02
[52] U.S. Cl. ........................................... 382/236; 348/416
[58] Field of Search ............................. 382/56, 54, 236, 382/239, 274; 348/699, 407, 409, 412, 413, 416, 687, 595, 688

[56] References Cited

U.S. PATENT DOCUMENTS

| | | | |
|---|---|---|---|
| 4,307,420 | 12/1981 | Ninomiya et al. | 348/413 |
| 4,404,593 | 9/1983 | Shanley, II et al. | 358/168 |
| 4,752,834 | 6/1988 | Koombes | 348/634 |
| 4,809,350 | 2/1989 | Shimoni et al. | 382/56 |
| 4,849,810 | 7/1989 | Ericsson | 358/136 |
| 5,019,901 | 5/1991 | Uomori et al. | 358/105 |
| 5,134,478 | 7/1992 | Golin | 358/105 |
| 5,150,209 | 9/1992 | Baker | 358/136 |
| 5,191,419 | 3/1993 | Wischermann | 348/595 |
| 5,245,436 | 9/1993 | Alattar | 348/595 |
| 5,262,855 | 11/1993 | Alattar et al. | 348/384 |

Primary Examiner—Joseph Mancuso
Assistant Examiner—Jon Chang
Attorney, Agent, or Firm—William H. Murray; N. Stephan Kinsella

[57] ABSTRACT

A method and apparatus for improving motion analysis in fade regions where motion compensation systems based on block matching typically fail to accurately encode images. A previous image is selected from an image sequence. A base image is calculated by adjusting the brightness of the previous image. A displacement vector representing the magnitude and direction of the displacement between at least one region in a target image and a corresponding region in the base image is determined. The displacement vector is applied to a corresponding region in a previous reconstructed image to form a predicted image, and is then encoded. Pixel values in the predicted image are subtracted from corresponding pixel values in the target image to form an error image which is also encoded.

10 Claims, 2 Drawing Sheets

METHOD AND APPARATUS FOR IMPROVING MOTION ANALYSIS OF FADES

This is a continuation of application Ser. No. 07/996,711 filed on Dec. 24, 1992, now abandoned.

This invention relates to video signal processing generally and particularly to systems for providing a compressed digital video signal representative of a full color video signal.

BACKGROUND

Many known methods of compressing sequences of digital video images utilize motion compensation, which requires an analysis of the motion between images. In an important method of motion analysis known as block matching, a target image in a sequence of images is divided into a plurality of blocks of pixels, each block comprising a predetermined number of pixels. A target region comprising at least one pixel block is selected from the target image. The image preceding the target image is analyzed in order to locate a region from the preceding image that closely matches the target region of the target image. Block matching techniques based on mean-square-error or mean-absolute-error are typically used to locate the region of the preceding image which closely matches the target region of the target image. If no motion has occurred, the preceding and target regions will have the same coordinates within the image frame. If motion has occurred, the preceding region will be offset or translated relative to the target region by an amount which is represented by a displacement vector. The displacement vector will thereafter be applied to a previous reconstructed image to form a predicted image. An error image is formed from the difference between the target image and the predicted image. The displacement vector and the error image are then encoded for subsequent use by a decoder in decoding the compressed digital video signal. A known motion compensation system is described in U.S. Pat. No. 5,134,478 to Golin, entitled "Method And Apparatus For Compressing And Decompressing A Digital Video Signal Using Predicted And Error Images", the contents of which is hereby incorporated herein by reference.

A significant change in brightness between images or frames in a digital video sequence can confound many methods of block matching, including those based on mean-square-error or mean-absolute-error. Since these block matching methods match brightness, they can yield inaccurate displacement vectors when there is an overall change in brightness between frames, even when the actual motion between such frames is very simple. It was found, however, that if the brightness change is approximately uniform over the image, as is the case with fades, the brightness change can be subtracted out for purposes of the motion compensation analysis, thus yielding more accurate displacement vectors. Although the subtraction of the brightness change was found to result in an error image having larger errors, the resulting errors were of low frequencies and thus could be encoded using fewer bits.

It is an object of the present invention to provide an improved motion compensation method that accurately determines motion, even where there is an overall change in brightness between frames.

Further objects and advantages of the invention will become apparent from the description of the invention which follows.

SUMMARY OF THE INVENTION

A method and apparatus for encoding a target image in a sequence of digital motion video images, the target image having been determined to be within a fade. A previous image is selected from the image sequence. A base image is calculated by adjusting the brightness of the previous image. A displacement vector representing the magnitude and direction of the displacement between at least one region in a target image and a corresponding region in the base image is determined. The displacement vector is applied to a corresponding region in a previous reconstructed image to form a predicted image, and is then encoded. Pixel values in the predicted image are subtracted from corresponding pixel values in the target image to form an error image which is also encoded.

DETAILED DESCRIPTION OF THE PREFERRED EMBODIMENT

Figure 1:
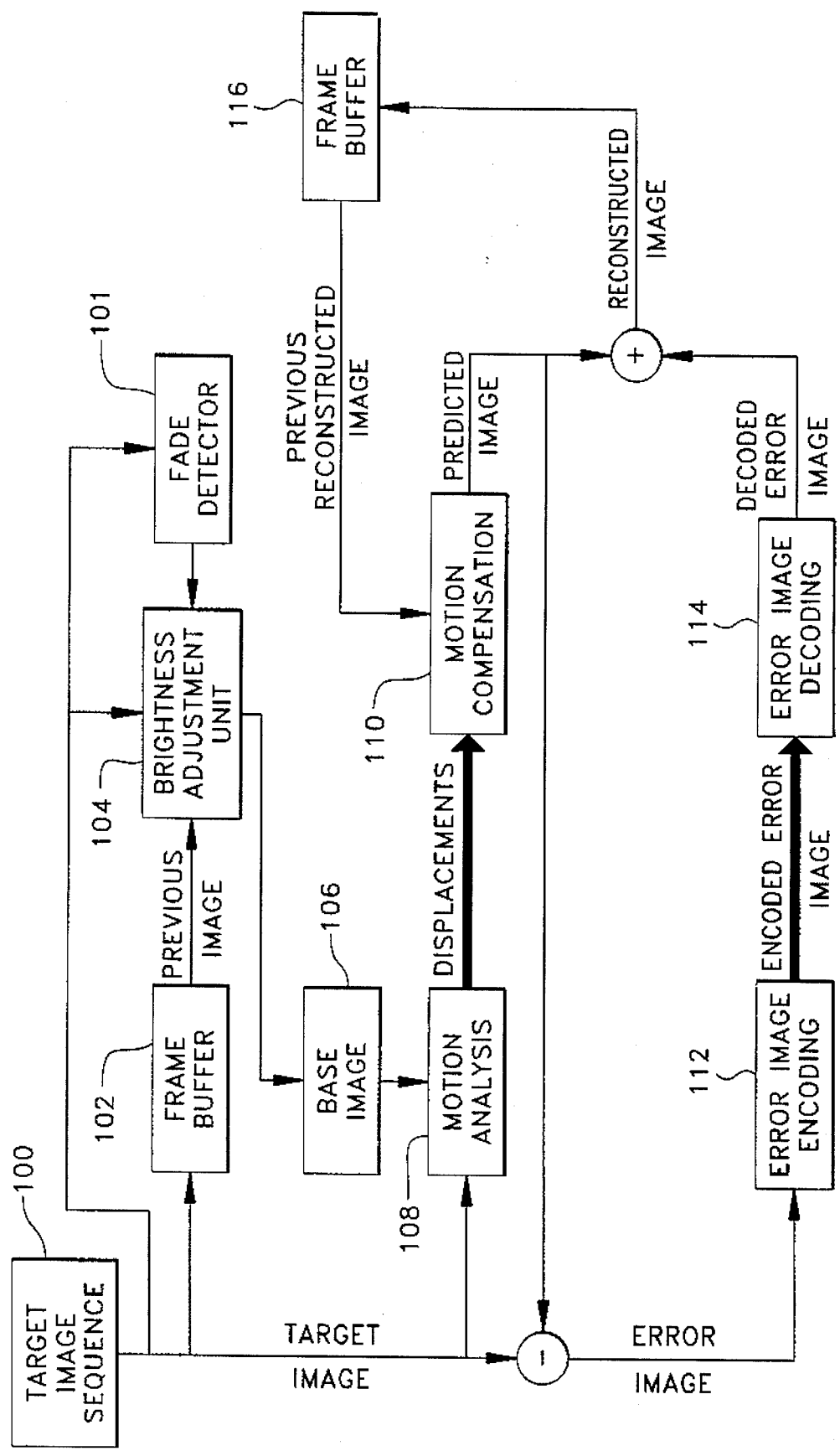
FIG. 1 shows a flow diagram illustrating the operation of a preferred embodiment of the present invention.

Referring now to FIG. 1, there is shown a flow diagram illustrating the operation of a preferred embodiment of the present invention. In accordance with this embodiment, a sequence of target images 100 are first analyzed by fade detector 101 to determine whether one or more of the images in the sequence fall within a fade region. A suitable fade region detector for use in connection with the present invention is described in co-pending U.S. Patent application Ser. No. 836,108 to Alattar, entitled "Method And Apparatus For Detecting Fades In Digital Video Sequences," filed Feb. 14, 1992 now U.S. Pat. No. 5,245,436, which is assigned to the assignee of the present application and the contents of which are incorporated herein by reference. A target image falling within a fade region is then selected from sequence 100 and stored in frame buffer 102. When a further (or current) target image is selected from sequence 100, the contents of frame buffer 102 will constitute a previous image.

The brightness of the current target image and that of the previous image stored in frame buffer 102 are analyzed by brightness adjustment unit 104 in order to calculate a base image 106. In a first preferred embodiment, brightness adjustment unit 104 determines the average value of the pixels in the current target image and the average value of the pixels in the previous image, and then subtracts these respective average values to form a brightness difference value. Means 104 then forms a base image 106 by reducing each pixel in the previous image by the brightness difference value.

In an alternative preferred embodiment of means 104, a first average brightness function is calculated on a frame-by-frame basis (by calculating the average brightness for each frame) in a window around the current target image. In other words, each point of the first average brightness function is calculated by determining the average brightness of a corresponding frame in the frame sequence that falls within a window on either side of the target image. The first average brightness function is then "smoothed" to remove the impact of noise in individual frames. This smoothing is preferably accomplished by a least-square-fit of the first average brightness function to a polynomial function. A brightness difference value is determined by means 104 from the difference between the value of the smoothed first average brightness function at the current image and the value of that function at the previous image. Means 104 forms a base image 106 by reducing each pixel in the previous image by this brightness difference value.

In a further preferred embodiment, brightness adjustment unit 104 determines the average value of the pixels in the current target image and the average value of the pixels in the previous image, and then divides these respective average values to form a brightness adjustment factor. Alternatively, a brightness adjustment factor is determined by means 104 by dividing the value of the smoothed first average brightness function at the current image by the value of that function at the previous image. Means 104 then forms a base image 106 by multiplying each pixel in the previous image by the brightness adjustment factor.

Motion analysis means 108 compares the current target image with the base image 106 to determine at least one displacement vector representing the magnitude and direction of the displacement between a region in the current target image and a corresponding region in base image 106. The displacement vector is then encoded. In one embodiment, block matching techniques based on mean-square-error or mean-absolute-error are used to locate one or more regions in the current target image which most closely match one or more respective corresponding regions in base image 106. Other block matching techniques may also be used.

Motion compensation means 110 forms a predicted image by applying displacement vectors calculated by motion analysis means 108 to a previous reconstructed image. An error image is formed by subtracting pixels in the current target image from pixels in the predicted image. The error image is encoded by error image encoding means 112 to form an encoded error image. In a preferred embodiment, pyramidal encoding or the discrete cosine transform ("DCT") are used by error image encoding means 112 to form the encoded error image. Both the pyramid and the DCT are preferred, because they encode low frequency error values using very few bits. Error image decoding means 114 is provided for forming a decoded error image from the encoded error image. In the preferred embodiment, the decoding method used by error image decoding means 114 will be the inverse of the encoding method used by means 112. A reconstructed image is formed by adding pixels in the predicted image to corresponding pixels in the decoded error image. The previous reconstructed image is formed for processing the next frame by storing the reconstructed image in frame buffer 116.

Figure 2:
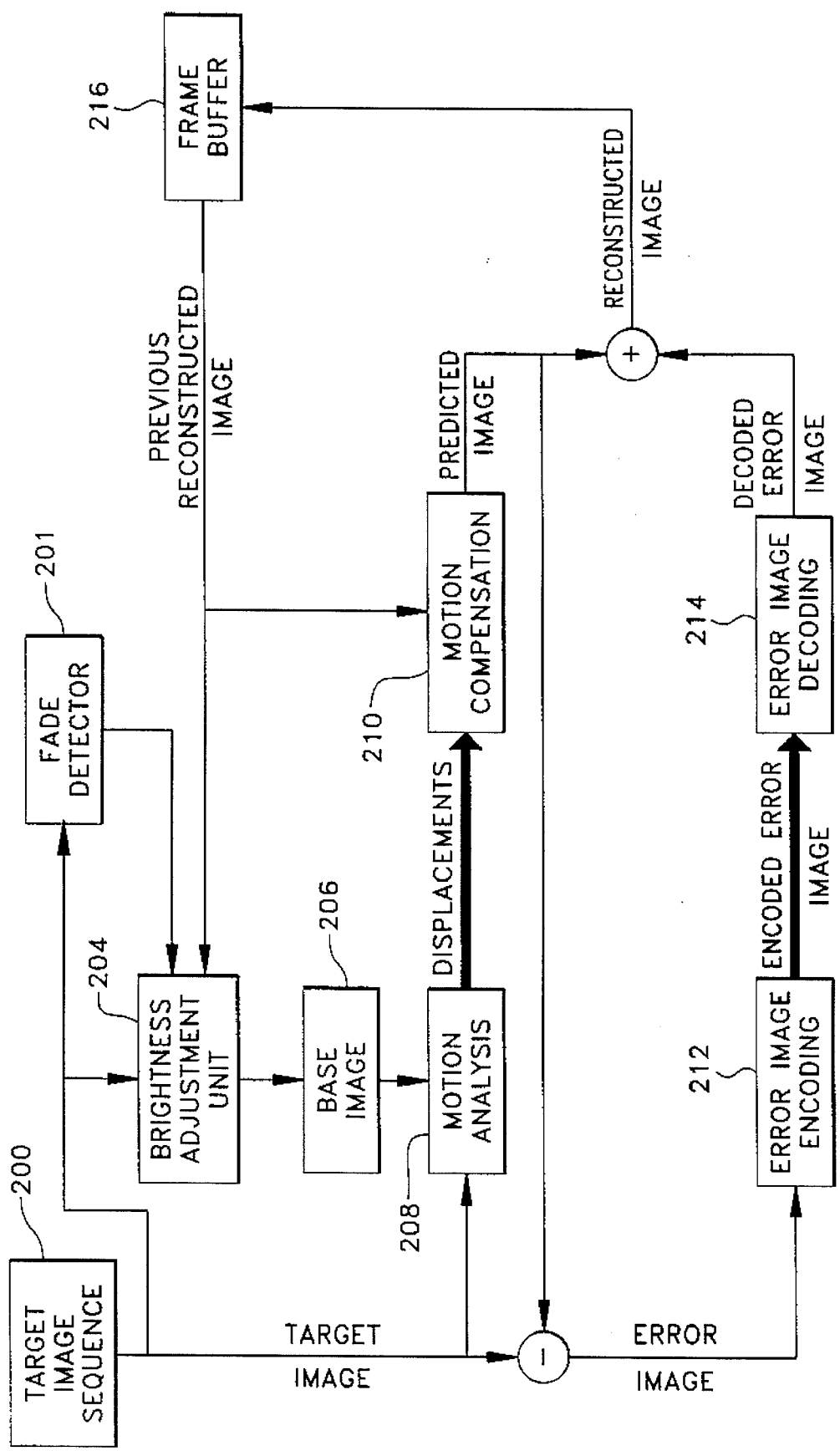
FIG. 2 shows a flow diagram illustrating the operation of an alternative preferred embodiment of the present invention.

Referring now to FIG. 2, there is shown a flow diagram illustrating the operation of a further alternative preferred embodiment of the present invention. In the system of FIG. 2, a sequence of target images 200 are first analyzed by fade detector 201 to determine whether one or more of the images in the sequence fall within a fade region. Fade detector 201 functions substantially in accordance with fade detector 101. The brightness of a current target image (that is within a fade region) and that of a previous reconstructed image stored in frame buffer 216 are compared by brightness adjustment unit 204 to calculate a base image 206. In a first preferred embodiment of the system of FIG. 2, brightness adjustment unit 204 determines the average value of the pixels in the current target image and the average value of the pixels in the previous reconstructed image, and then subtracts these respective average values to form a brightness difference value. Means 204 then forms a base image 206 by reducing each pixel in the previous reconstructed image by the brightness difference value calculated by means 204.

In an alternative preferred embodiment of means 204, a second average brightness function is calculated on a frame-by-frame basis (by calculating the average brightness for each frame) in a window around the current target image. In other words, each point of the first average brightness function is calculated by determining the average brightness of a corresponding frame in the frame sequence that falls within a window on either side of the target image. The second average brightness function is then "smoothed" to remove the impact of noise in individual frames. This smoothing is preferably accomplished by a least-square-fit of the second average brightness function to a polynomial function. A brightness difference value is determined by means 204 from the difference between the value of the smoothed second average brightness function at the current image and the value of that function at the previous reconstructed image. Means 204 forms a base image 206 by reducing each pixel in the previous reconstructed image by this brightness difference value.

In a further preferred embodiment of the system of FIG. 2, brightness adjustment unit 204 determines the average value of the pixels in the current target image and the average value of the pixels in the previous reconstructed image, and then divides these respective average values to form a brightness adjustment factor. Alternatively, a brightness adjustment factor is determined by means 204 by dividing the value of the smoothed second average brightness function at the current image by the value of that function at the previous reconstructed image. Means 204 then forms a base image 206 by multiplying each pixel in the previous reconstructed image by the brightness adjustment factor.

In the embodiment shown in FIG. 2, motion analysis means 208 functions substantially in accordance with motion analysis means 108; motion compensation means 210 functions substantially in accordance with motion compensation means 110; error image encoding means 212 and error image decoding means 214 function substantially in accordance with error image encoding means 112 and error image decoding means 114, respectively; and frame buffer 216 functions substantially in accordance with frame buffer 116.

The present invention may be implemented using an Intel model i860 parallel processor or a general purpose processor. The present invention may be embodied in other specific forms without departing from the spirit or essential attributes of the invention. Accordingly, reference should be made to the appended claims, rather than the foregoing specification, as indicating the scope of the invention.

What is claimed is:

1. A computer-implemented method for forming a compressed digital video signal from a target digital video signal representative of a target image in a sequence of digital motion video images, said target image being represented by an array of pixels, the method comprising the steps of:

(a) selecting a previous image from said sequence;

(b) determining whether said target image is within a fade and, if said target image is determined to be within a fade, then calculating a base image by adjusting the brightness of said selected previous image; step (b) comprising the steps of:

determining the average value of said target image:

(ii) determining the average value of said selected previous image:

(iii) calculating a brightness difference value by determining the difference of the average values determined in steps (b)(i) and (b)(ii); and (iv) calculating a base image by reducing the brightness of said selected previous image by said brightness difference value;

(c) providing at least one displacement vector representing the magnitude and direction of the displacement between at least one region of pixels in said target image and a corresponding region of pixels in said base image;

(d) applying said at least one displacement vector to a corresponding region of pixels in a previous reconstructed image to form a predicted image;

(e) encoding said at least one displacement vector;

(f) subtracting pixel values in said predicted image from corresponding pixel values in said target image to form an error image;

(g) encoding said error image; and (h) forming said compressed digital video signal from said target digital video signal in accordance with said at least one encoded displacement vector and said encoded error image, wherein said compressed digital video signal is an electrical signal representative of said target digital video signal;

wherein said pixels of said target image have associated values representative of the amplitude of said target digital video signal, and wherein said target digital video signal is representative of an electrical signal used to display said target image.

2. The method of claim 1, wherein said at least one previous image is a reconstructed image.

3. An apparatus for forming a compressed digital video signal from a target digital video signal representative of a target image in a sequence of digital motion video images, said target image being represented by an array of pixels, the apparatus comprising:

(a) means for selecting a previous image from said sequence;

(b) fade detection means for determining whether said target image is within a fade;

(c) brightness adjustment means, responsive to said fade detection means, for calculating a base image by adjusting the brightness of said selected previous image if said target image is determined to be within a fade, wherein said brightness adjustment means comprises:

(i) means for determining the average value of said target image;

(ii) means for determining the average value of said selected previous image;

(iii) means for calculating a brightness difference value by determining the difference of said average value of said target image and said average value of said selected previous image; and (iv) means for calculating a base image by reducing the brightness of said selected previous image by said brightness difference value;

(d) motion analysis means for providing at least one displacement vector representing the magnitude and direction of the displacement between at least one region of pixels in said target image and a corresponding region of pixels in said base image;

(e) motion compensation means for applying said at least one displacement vector to a corresponding region of pixels in a previous reconstructed image to form a predicted image;

(f) means for encoding said at least one displacement vector;

(g) means for subtracting pixel values in said predicted image from corresponding pixel values in said target image to form an error image;

(h) means for encoding said error image; and (h) means for forming said compressed digital video signal from said target digital video signal in accordance with said at least one encoded displacement vector and said encoded error image, wherein said compressed digital video signal is an electrical signal representative of said target digital video signal;

wherein said pixels of said target image have associated values representative of the amplitude of said target digital video signal, and wherein said target digital video signal is representative of an electrical signal used to display said target image.

4. The apparatus of claim 3, wherein said at least one previous image is a reconstructed image.

5. A computer-implemented method for forming a compressed digital video signal from a target digital video signal representative of a target image in a sequence of digital motion video images, said target image being represented by an array of pixels, the method comprising the steps of:

(a) selecting a previous image from said sequence;

(b) determining whether said target image is within a fade and, if said target image is determined to be within a fade, then calculating a base image by adjusting the brightness of said selected previous image; step (b) comprising the steps of:

(i) determining the average value of said target image;

(ii) determining the average value of a selected previous image;

(iii) calculating a brightness adjustment factor by dividing the result of step (b)(i) by the result of step (b)(ii); and (iv) calculating a base image by multiplying the pixels in said selected previous image by said brightness adjustment factor;

(c) providing at least one displacement vector representing the magnitude and direction of the displacement between at least one region of pixels in said target image and a corresponding region of pixels in said base image;

(d) applying said at least one displacement vector to a corresponding region of pixels in a previous reconstructed image to form a predicted image;

(e) encoding said at least one displacement vector;

(f) subtracting pixel values in said predicted image from corresponding pixel values in said target image to form an error image;

(g) encoding said error image; and (h) forming said compressed digital video signal from said target digital video signal in accordance with said at least one encoded displacement vector and said encoded error image, wherein said compressed digital video signal is an electrical signal representative of said target digital video signal;

wherein said pixels of said target image have associated values representative of the amplitude of said target digital video signal, and wherein said target digital video signal is representative of an electrical signal used to display said target image.

6. A computer-implemented method for forming a compressed digital video signal from a target digital video signal representative of a target image in a sequence of digital motion video images, said target image being represented by an array of pixels, the method comprising the steps of:

(a) selecting a previous image from said sequence;

(b) determining whether said target image is within a fade and, if said target image is determined to be within a fade, then calculating a base image by adjusting the brightness of said selected previous image; step (b) comprising the steps of:

(i) determining the average value of said target image;

(ii) determining the average value of each image in a plurality of images in a window around said target image;

(iii) forming an average brightness function from said average value of said target image and said average value of each image in said plurality of images;

(iv) smoothing said average brightness function;

(v) calculating a brightness difference value by determining the difference of the value of said smoothed function at said target image and the value of said smoothed function at said selected previous image; and (vi) calculating a base image by reducing the brightness of said selected previous image by said brightness difference value;

(c) providing at least one displacement vector representing the magnitude and direction of the displacement between at least one region of pixels in said target image and a corresponding region of pixels in said base image;

(d) applying said at least one displacement vector to a corresponding region of pixels in a previous reconstructed image to form a predicted image;

(e) encoding said at least one displacement vector;

(f) subtracting pixel values in said predicted image from corresponding pixel values in said target image to form an error image;

(g) encoding said error image; and (h) forming said compressed digital video signal from said target digital video signal in accordance with said at least one encoded displacement vector and said encoded error image, wherein said compressed digital video signal is an electrical signal representative of said target digital video signal;

wherein said pixels of said target image have associated values representative of the amplitude of said target digital video signal, and wherein said target digital video signal is representative of an electrical signal used to display said target image.

7. A computer-implemented method for forming a compressed digital video signal from a target digital video signal representative of a target image in a sequence of digital motion video images, said target image being represented by an array of pixels, the method comprising the steps of:

(a) selecting a previous image from said sequence;

(b) determining whether said target image is within a fade and, if said target image is determined to be within a fade, then calculating a base image by adjusting the brightness of said selected previous image; step (b) comprising the steps of:

(i) determining the average value of said target image;

(ii) determining the average value of each image in a plurality of images in a window around said target image;

(iii) forming an average brightness function from said average value of said target image and said average value of each image in said plurality of images;

(iv) smoothing said average brightness function;

(v) calculating a brightness adjustment factor by dividing the value of said smoothed function at said target image and the value of said smoothed function at said selected previous image; and (vi) calculating a base image by multiplying the pixels in said selected previous image by said brightness adjustment factor;

(c) providing at least one displacement vector representing the magnitude and direction of the displacement between at least one region of pixels in said target image and a corresponding region of pixels in said base image;

(d) applying said at least one displacement vector to a corresponding region of pixels in a previous reconstructed image to form a predicted image;

(e) encoding said at least one displacement vector;

(f) subtracting pixel values in said predicted image from corresponding pixel values in said target image to form an error image;

(g) encoding said error image; and (h) forming said compressed digital video signal from said target digital video signal in accordance with said at least one encoded displacement vector and said encoded error image, wherein said compressed digital video signal is an electrical signal representative of said target digital video signal;

wherein said pixels of said target image have associated values representative of the amplitude of said target digital video signal, and wherein said target digital video signal is representative of an electrical signal used to display said target image.

8. An apparatus for forming a compressed digital video signal from a target digital video signal representative of a target image in a sequence of digital motion video images, said target image being represented by an array of pixels, the apparatus comprising:

(a) means for selecting a previous image from said sequence;

(b) fade detection means for determining whether said target image is within a fade;

(c) brightness adjustment means, responsive to said fade detection means, for calculating a base image by adjusting the brightness of said selected previous image if said target image is determined to be within a fade, wherein said brightness adjustment means comprises:

(i) means for determining the average value of said target image;

(ii) means for determining the average value of said selected previous image;

(iii) means for calculating a brightness adjustment factor by dividing said average value of said target image by said average value of said selected previous image; and (iv) means for calculating a base image by multiplying the pixels in said selected previous image by said brightness adjustment factor;

(d) motion analysis means for providing at least one displacement vector representing the magnitude and direction of the displacement between at least one region of pixels in said target image and a corresponding region of pixels in said base image;

(e) motion compensation means for applying said at least one displacement vector to a corresponding region of pixels in a previous reconstructed image to form a predicted image;

(f) means for encoding said at least one displacement vector;

(g) means for subtracting pixel values in said predicted image from corresponding pixel values in said target image to form an error image;

(h) means for encoding said error image; and (h) means for forming said compressed digital video signal from said target digital video signal in accordance with said at least one encoded displacement vector and said encoded error image, wherein said compressed digital video signal is an electrical signal representative of said target digital video signal;

wherein said pixels of said target image have associated values representative of the amplitude of said target digital video signal, and wherein said target digital video signal is representative of an electrical signal used to display said target image.

9. An apparatus for forming a compressed digital video signal from a target digital video signal representative of a target image in a sequence of digital motion video images, said target image being represented by an array of pixels, the apparatus comprising:

(a) means for selecting a previous image from said sequence;

(b) fade detection means for determining whether said target image is within a fade;

(c) brightness adjustment means, responsive to said fade detection means, for calculating a base image by adjusting the brightness of said selected previous image if said target image is determined to be within a fade, wherein said brightness adjustment means comprises:

(i) means for determining the average value of said target image;

(ii) means for determining the average value of each image in a plurality of images in a window around said target image;

(iii) means for forming an average brightness function from said average value of said target image and said average value of each image in said plurality of images;

(iv) means for smoothing said average brightness function;

(v) means for calculating a brightness difference value by determining the difference of the value of said smoothed function at said target image and the value of said smoothed function at said selected previous image; and (vi) means for calculating a base image by reducing the brightness of said selected previous image by said brightness difference value;

(d) motion analysis means for providing at least one displacement vector representing the magnitude and direction of the displacement between at least one region of pixels in said target image and a corresponding region of pixels in said base image;

(e) motion compensation means for applying said at least one displacement vector to a corresponding region of pixels in a previous reconstructed image to form a predicted image;

(f) means for encoding said at least one displacement vector;

(g) means for subtracting pixel values in said predicted image from corresponding pixel values in said target image to form an error image;

(h) means for encoding said error image; and (h) means for forming said compressed digital video signal from said target digital video signal in accordance with said at least one encoded displacement vector and said encoded error image, wherein said compressed digital video signal is an electrical signal representative of said target digital video signal;

wherein said pixels of said target image have associated values representative of the amplitude of said target digital video signal, and wherein said target digital video signal is representative of an electrical signal used to display said target image.

10. An apparatus for forming a compressed digital video signal from a target digital video signal representative of a target image in a sequence of digital motion video images, said target image being represented by an array of pixels, the apparatus comprising:

(a) means for selecting a previous image from said sequence;

(b) fade detection means for determining whether said target image is within a fade;

(c) brightness adjustment means, responsive to said fade detection means, for calculating a base image by adjusting the brightness of said selected previous image if said target image is determined to be within a fade, wherein said brightness adjustment means comprises:

(i) means for determining the average value of said target image;

(ii) means for determining the average value of each image in a plurality of images in a window around said target image;

(iii) means for forming an average brightness function from said average value of said target image and said average value of each image in said plurality of images;

(iv) means for smoothing said average brightness function;

(v) means for calculating a brightness adjustment factor by dividing the value of said smoothed function at said target image and the value of said smoothed function at said selected previous image; and (vi) means for calculating a base image by multiplying the pixels in said selected previous image by said brightness adjustment factor;

(d) motion analysis means for providing at least one displacement vector representing the magnitude and direction of the displacement between at least one region of pixels in said target image and a corresponding region of pixels in said base image;

(e) motion compensation means for applying said at least one displacement vector to a corresponding region of pixels in a previous reconstructed image to form a predicted image;

(f) means for encoding said at least one displacement vector;

(g) means for subtracting pixel values in said predicted image from corresponding pixel values in said target image to form an error image;

(h) means for encoding said error image; and (h) means for forming said compressed digital video signal from said target digital video signal in accordance with said at least one encoded displacement vector and said encoded error image, wherein said compressed digital video signal is an electrical signal representative of said target digital video signal;

wherein said pixels of said target image have associated values representative of the amplitude of said target digital video signal, and wherein said target digital video signal is representative of an electrical signal used to display said target image.

\* \* \* \* \*